(12) United States Patent
Yemington

(10) Patent No.: US 7,708,839 B2
(45) Date of Patent: May 4, 2010

(54) SUBSEA VEHICLE ASSISTED PIPELINE DEWATERING METHOD

(75) Inventor: Charles R. Yemington, Houston, TX (US)

(73) Assignee: Valkyrie Commissioning Services, Inc., Houston, TX (US)

( * ) Notice: Subject to any disclaimer, the term of this patent is extended or adjusted under 35 U.S.C. 154(b) by 931 days.

(21) Appl. No.: 11/152,217

(22) Filed: Jun. 15, 2005

(65) Prior Publication Data

US 2007/0003371 A1    Jan. 4, 2007

Related U.S. Application Data

(60) Continuation-in-part of application No. 10/365,832, filed on Feb. 13, 2003, now Pat. No. 7,281,880, which is a division of application No. 09/892,314, filed on Jun. 26, 2001, now Pat. No. 6,539,778.

(60) Provisional application No. 60/275,215, filed on Mar. 13, 2001.

(51) Int. Cl.
*B08B 9/027* (2006.01)

(52) U.S. Cl. .................. 134/22.11; 405/154.1

(58) Field of Classification Search .................. None
See application file for complete search history.

(56) References Cited

U.S. PATENT DOCUMENTS

| | | | |
|---|---|---|---|
| 3,520,358 A | 7/1970 | Brooks | |
| 3,640,299 A | 2/1972 | Nelson | |
| 3,708,990 A | 1/1973 | Crooke | |
| 3,777,499 A | 12/1973 | Matthew et al. | |
| 3,788,084 A * | 1/1974 | Matthews, Jr. | 405/173 |
| 3,961,493 A | 6/1976 | Nolan et al. | |
| 4,155,669 A | 5/1979 | Rochelle | |
| 4,229,121 A | 10/1980 | Brown | |
| 4,234,268 A * | 11/1980 | Scodino | 405/158 |
| 4,332,277 A | 6/1982 | Adkins et al. | |
| 4,344,319 A | 8/1982 | Hancock et al. | |
| 4,445,804 A * | 5/1984 | Abdallah et al. | 405/173 |

(Continued)

FOREIGN PATENT DOCUMENTS

GB    2195739 A    4/1988

(Continued)

OTHER PUBLICATIONS

Macaroni Deepwater Development Manual.

(Continued)

*Primary Examiner*—Michael Kornakov
*Assistant Examiner*—Eric Golightly
(74) *Attorney, Agent, or Firm*—Wong, Cabello, Lutsch, Rutherford & Brucculeri, LLP

(57) ABSTRACT

The present invention is directed to a pig receiver used in a dewatering method for subsea pipelines. In the dewatering method a pig is placed in one end of the pipeline filled with water and a compressed gas is introduced behind the pig; in addition the water and pig are drawn by a subsea pump operated by a submersible vehicle (SV) operating near the sea floor to a pig receiver of the present invention. A feature of the pig receiver is a gas sensor that shuts the pump off when gas enters the receiver to prevent a gas (vapor) lock of the pump.

5 Claims, 3 Drawing Sheets

U.S. PATENT DOCUMENTS

| | | | |
|---|---|---|---|
| 4,463,597 A | | 8/1984 | Pierce et al. |
| 4,906,136 A | * | 3/1990 | Norbom et al. ............. 405/169 |
| 5,044,827 A | | 9/1991 | Gray et al. |
| 5,192,167 A | | 3/1993 | da Silva et al. |
| 5,267,616 A | | 12/1993 | Silva et al. |
| 5,273,376 A | | 12/1993 | Ritter, Jr. |
| 5,348,451 A | | 9/1994 | Mohn |
| 5,421,674 A | | 6/1995 | Maloberti et al. |
| 5,842,816 A | | 12/1998 | Cunningham |
| 5,883,303 A | | 3/1999 | Bliss et al. |
| 5,927,901 A | | 7/1999 | Graves |
| 5,975,803 A | | 11/1999 | Mackinnon |
| 6,022,421 A | | 2/2000 | Bath et al. |
| 6,109,829 A | | 8/2000 | Cruickshank |
| 6,145,223 A | | 11/2000 | Flesen |
| 6,170,493 B1 | | 1/2001 | Sivacoe |
| 6,200,068 B1 | | 3/2001 | Bath et al. |
| 6,234,717 B1 | | 5/2001 | Corbetta |
| 6,290,431 B1 | | 9/2001 | Exley et al. |
| 6,336,238 B1 | | 1/2002 | Tarlton |
| 6,435,279 B1 | | 8/2002 | Howe et al. |
| 6,454,492 B1 | | 9/2002 | Dean et al. |
| 6,503,021 B2 | | 1/2003 | Corbetta |
| 6,549,857 B2 | | 4/2003 | Fierro et al. |
| 2002/0040782 A1 | | 4/2002 | Rytlewski et al. |
| 2002/0059687 A1 | | 5/2002 | Smith et al. |
| 2002/0129641 A1 | | 9/2002 | Tucker et al. |
| 2003/0145991 A1 | | 8/2003 | Olsen |
| 2003/0170077 A1 | | 9/2003 | Herd et al. |
| 2004/0031623 A1 | | 2/2004 | Fontana |
| 2006/0162934 A1 | | 7/2006 | Shepler |

FOREIGN PATENT DOCUMENTS

| | | | |
|---|---|---|---|
| JP | 06226185 A | | 8/1994 |
| JP | 0715114 A1 | | 6/1995 |
| WO | 02/084160 | | 10/2002 |
| WO | WO 02/084160 A1 | | 10/2002 |
| WO | 02088658 | | 11/2002 |

OTHER PUBLICATIONS

Email from John Everard to Mike Dupre regarding the Brazil Project dated Jan. 8, 2002.
Deposition transcript of Mr. Georg Eric Engelmann.
Deposition transcript of Mike Dupre dated Sep. 3, 2004, vol. 2.
Deposition transcript of Mike Dupre dated Aug. 30, 2004, vol. 1.
Deposition transcript of John Everard dated Sep. 29, 2004.
Power Point rebuttal by Charles Yemington, technical expert for Valkyrie.
Settlement Agreement.
Graves, Les, "Deepwater Pipeline Flooding and Pigging Without Connection to a Surface Vessel," Transaction-Institute of Marine Engineers, Series C, 1999; V 111, No. 1, pp. 151-160.
NACE International, "Public Affairs-White Paper," http://www.nace.org.nace/content/pulicaffairs/media/pims.asp.
Battelle, "Energy & Environment: Determining Benefits of Hydrotesting," http://www. battelle.org/environment/hydrotesting.stm.
"Hydrostatic Test," http://en.wikipedia.org/wiki/hydrostatic_test.
Engineered Products Catalogue, May 2002.
Syd Graves, "Vessel-free flooding of deepwater pipelines using the Copipe SPU," Proceedings of the 1998 Deepwater Pipeline Technology Conference, New Orleans, USA Mar. 9-11, 1998.
Copipe, "Subsea pig works independently of DSVs," Offshore Magazine, Oil & Gas Journal vol. 58, Issue 2, Feb. 1998.
"BJ Process and Pipeline Services completes major pipeline pre-commissioning operation for DSND," Hydrocarbononline.com, Aug. 29, 2000.
Valkyrie "ROV-based solution simplifies pipeline commissioning," www.offshore-mag.com, vol. 62, Issue 3, Mar. 1, 2002.

* cited by examiner

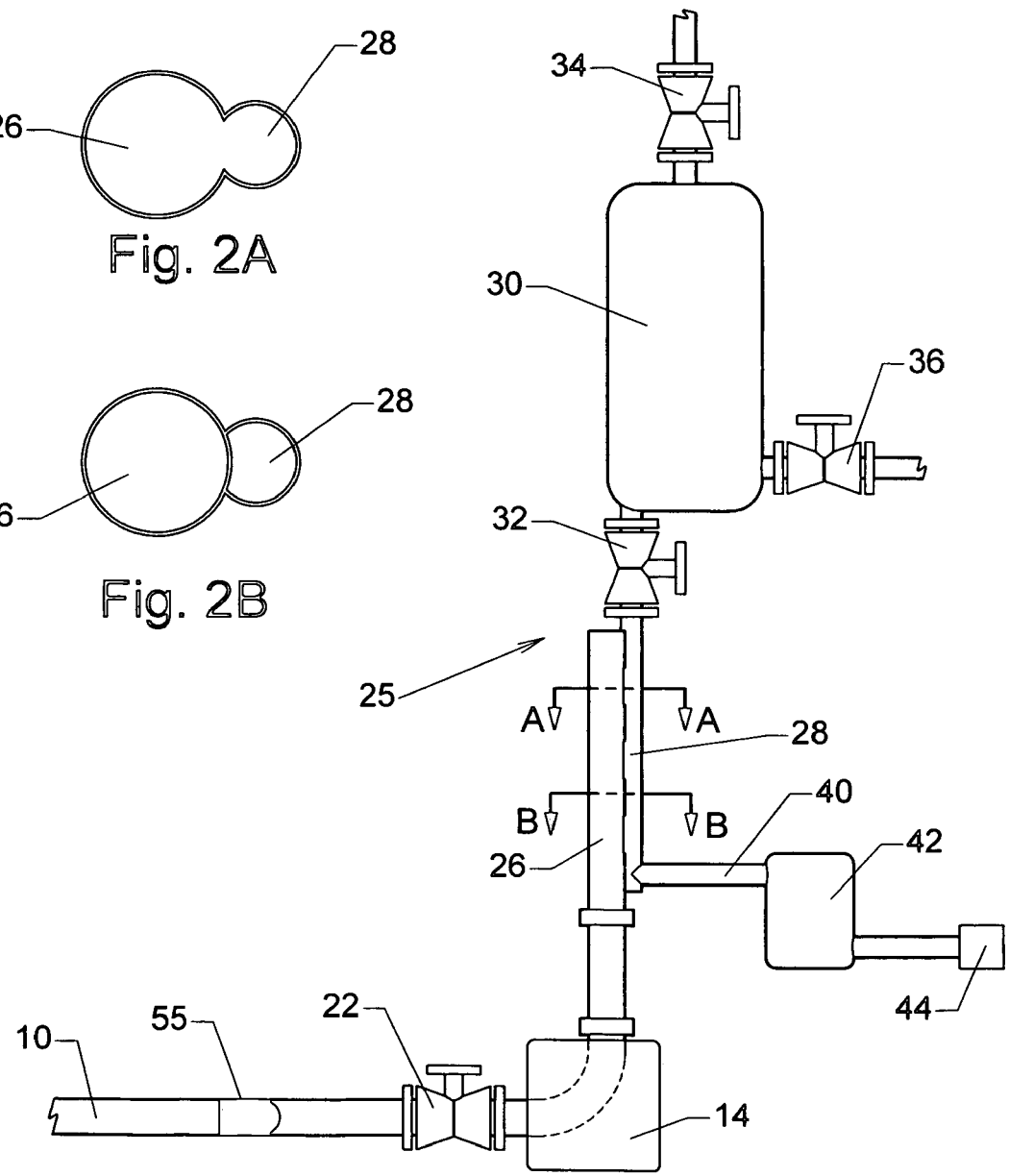
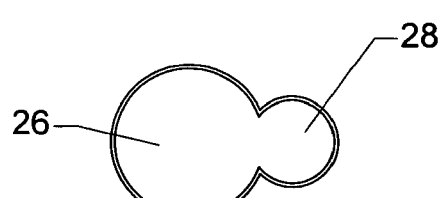
Fig. 2A
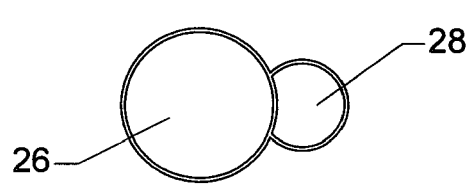
Fig. 2B
Fig. 2

SUBSEA VEHICLE ASSISTED PIPELINE DEWATERING METHOD

RELATED APPLICATIONS

This application is a continuation-in-part application of U.S. patent application Ser. No. 10/365,832, filed Feb. 13, 2003, now U.S. Pat. No. 7,281,880 which is a divisional U.S. patent application of Ser. No. 09/892,314, filed Jun. 26, 2001, now U.S. Pat. No. 6,539,778 which in turn is based on provisional application 60/275,215, filed Mar. 13, 2001 entitled "Subsea to Subsea Remotely Operated Vehicle Assisted Pipeline Commissioning Method", each of which are incorporated herein by reference.

FIELD OF THE INVENTION

The present invention is directed to a subsea commissioning method, specifically the dewatering method for subsea pipelines. Pipelines are dewatered to differing degrees of dryness by different methods for different purposes. In some instances a pipeline is dewatered sufficiently to lighten the pipeline enough to pick the pipeline up without bending or breaking the line. In other instances, it is necessary to remove essentially all the water so that the remaining water is not of sufficient quantity to react with light hydrocarbons, i.e. methane, to form hydrate ice, which could block the pipeline or reduce its capacity. In other instances, it is necessary to remove all of the water to inhibit corrosion during the period before the pipeline is placed in service. The present invention addresses a method of dewatering the pipeline to the latter two criteria, prevention of hydrate formation and prevention of corrosion.

More specifically, the present invention is directed to a pig receiver in a dewatering method of the present invention where the water and pig are drawn by a subsea pump operated by a submersible vehicle (SV) operating near the sea floor, and gas is introduced at the other end of the pipeline behind the pig. A feature of the pig receiver is a gas sensor in the line to the pump that shuts the pump off when gas enters this line to prevent a gas (vapor) block of the pump and a chamber that allows this low pressure gas to be captured and vented into the high-pressure ambient seawater so that the pumping can resume.

The method of the present invention significantly reduces the quantity of compressed gas needed to push the pig(s) by using a pump to overcome the hydrostatic head. This is a desirable feature because fluid pumps inherently have a much higher efficiency than gas compressors. A feature of the pig receiver is that it allows the pig to be pumped all the way to the receiver, even if a significant amount of the gas leaks past the pig and gets between the pig and the water pump. It is frequently necessary to use multiple pigs to achieve the desired results. Still another feature of the pig receiver is that it allows multiple pigs, separated along the pipeline to be pumped or drawn into the receiver by a water pump, even if the pipeline length between two or more pigs is initially filled with gas. This allows the use of multiple pigs separated by gas to remove as much water as can be done by swabbing or squeegee action. In applications where absolute dryness must be achieved, a slug of water absorbing chemical (such as methanol or acetone) can be placed between two of the pigs to remove the last traces of moisture from the pipe wall and/or a slug of liquid corrosion-inhibiting chemical can be placed between two pigs and this can be followed by a pig that pushes a slug of gas.

BACKGROUND OF THE INVENTION

U.S. Pat. No. 5,883,303 discloses and describes an apparatus and method for pigging, flooding and pressure testing pipelines.

The above patent is directed to the testing required when a new pipeline is placed in operation. However, when commissioning a subsea pipeline, or adding a new segment to an existing offshore pipeline, it is often desired to follow the hydrostatic pressure testing with an inert gas or specified medium to purge/dewater from the subsea pipeline, and/or inject specified chemicals, to dry the inside of the line before flow of the oil/gas in the pipeline.

The dewatering of a subsea pipeline by the prior art has been at surface level, usually on a surface vessel, boat, structure or platform. This requires that long lines of coiled tubing, hose, or pipe, be used if at least one end of the pipeline is not at the surface. The prior art method for dewatering uses large distances of coiled tubing, hose, or pipe, to connect the pipeline to a high volume, high pressure compressor mobilized on the deck of a platform or support vessel to remove the water and dry the line before product is allowed to pass through the line. Also required by the prior art method are large compressors, compressor boosters and surface support vessel and/or vessels, to support the large volume of compressed gases needed to fill the new portion of the pipeline with the gas to purge the water from the pipeline.

The method of the present invention eliminates the larger volume of compressed gas, the higher pressure of the compressed gas, the large pumps/compressors, compressor boosters, long distances of coiled tubing/hose/pipe, and substantial surface support vessel/vessels, all required by the prior art methods.

The following United States Patents were cited in the parent application:

U.S. Pat. No. 3,640,299 discloses a fluid energized control system for controlling the valves of subsea wellheads.

U.S. Pat. No. 3,777,499 discloses a method for recovering the end of a damaged line from the bottom of a body of water by introducing gas into one end of the line and pumping liquids from the other end until a section of the line at least sufficiently long to reach the surface is made light enough to lift without breaking under its own weight.

U.S. Pat. No. 3,961,493 discloses a typical method for removing water from a subsea pipeline by compressed gas. Compressed gas is introduced into a pipeline behind a pig forcing the water out the other end. There is no pump disclosed.

U.S. Pat. No. 4,234,268 discloses apparatus for recovering by means of a pipeline craft, pipes laid on deep sea beds.

U.S. Pat. No. 4,906,136 discloses a method for connecting a conduit to a subsea structure and a device for use in connecting a conduit end to a subsea structure.

U.S. Pat. No. 5,044,827 discloses a method for severing and recovering a submerged pipeline.

U.S. Pat. No. 5,273,376 discloses an emergency release tool for operation by a remotely operated vehicle (ROV) for forcefully releasing a riser from a subsea well assembly.

U.S. Pat. No. 5,927,901 discloses an underwater pipeline apparatus for the free flooding, using the head of water above the subsea pipeline, to force a pig through the pipeline and flood (fill with water) a pipeline that is filled with a gas. In the event that the head of water is insufficient to force the pig completely to the end, the apparatus has a pump that may be operated from the surface or from a remotely operated vehicle to complete the flooding.

U.S. Pat. No. 6,022,421 discloses a method for sensing and launching pipeline pigs into a pipeline.

U.S. Pat. No. 6,145,223 discloses a dredging apparatus fpr the removal of cuttings gathered around a bore hole mouth on the seabed including an ejector coupled to a suction hose and a conveyor pipe.

U.S. Pat. No. 6,454,492 discloses a pig launching system and a pig receiving system for use in cleaning a subsea flowline.

US 2003/0170077 A1 discloses riser systems and methods for raising production fluid within the riser system downstream of a subsea source or plurality of sources.

SUMMARY OF THE INVENTION

The present invention is directed to a pig receiver used in a dewatering method for subsea pipelines. In this dewatering method, a pig is placed in one end of the pipeline filled with water and compressed gas is introduced behind the pig; in addition the water and pig are drawn by a subsea pump operated by a submersible vehicle (SV) operating near the sea floor to a pig receiver of the present invention. A feature of pumping water from the pipeline is that the hydrostatic head can be overcome by the pump so that the gas pressure behind the pig need be no higher than is required to overcome friction between the pig(s) and the pipe wall. A feature of the pig receiver is a gas sensor that shuts the pump off when gas enters the receiver to prevent a gas lock (loss of prime) of the pump and a method for disposing of this gas so that the pump can be restarted.

BRIEF DESCRIPTION OF THE DRAWINGS

FIG. 2 is a schematic view of a subsea pipeline with a first pig in the pipeline and at the end of the pipeline on or near the seabed is a pig receiver of the present invention having a stand pipe that supports a gas discharge chamber;

FIG. 2A is a cross-sectional view along section A-A of the pig receiver chamber and stand pipe showing an opening (fluid communication) between the receiver chamber and stand pipe;

FIG. 2B is a cross-sectional view along section B-B of the pig receiver chamber and stand pipe showing independent structures of the receiver and stand pipe.

BRIEF DESCRIPTION OF THE PREFERRED EMBODIMENTS OF THE PRESENT INVENTION

Figure 1:
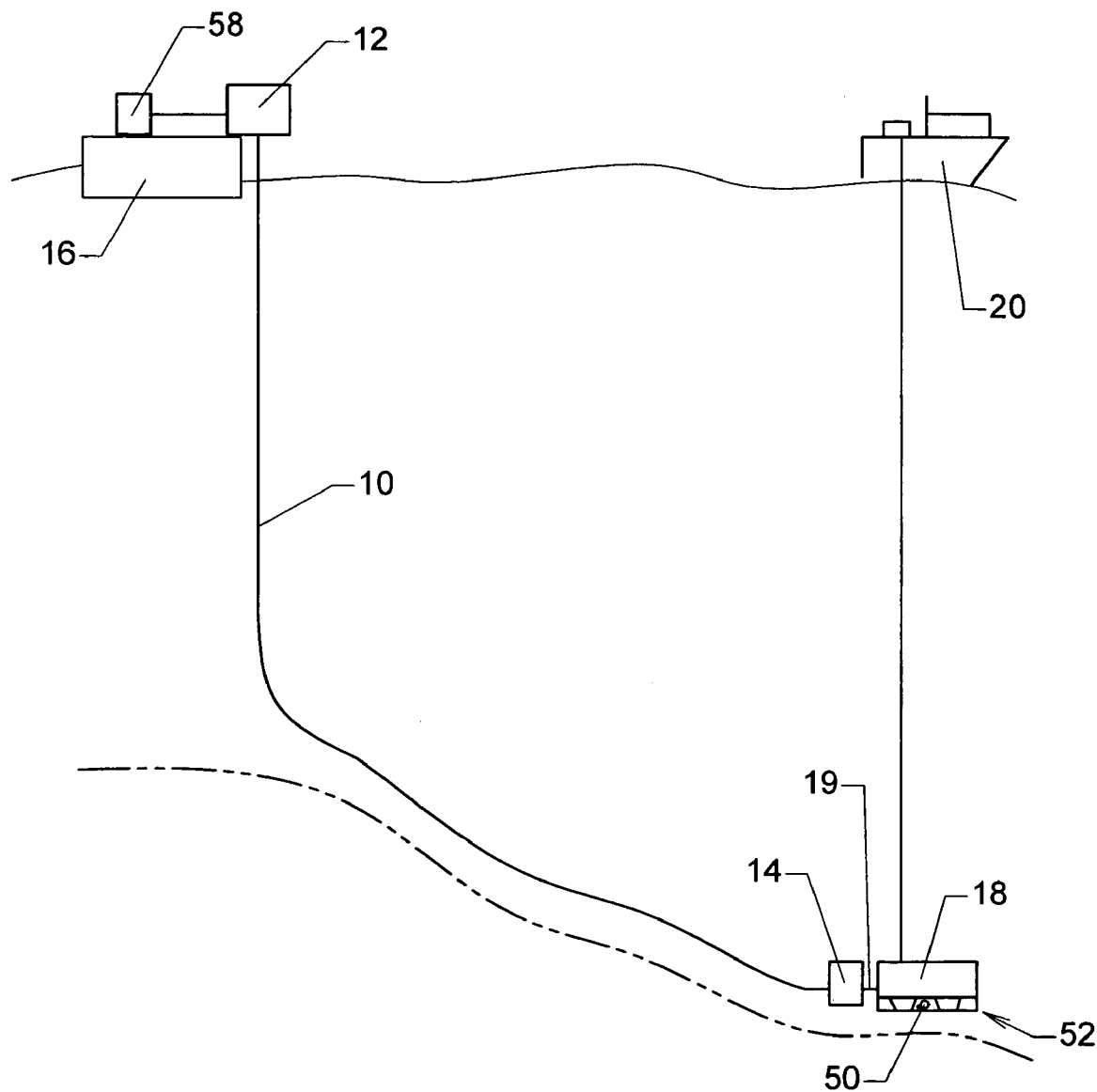
FIG. 1 is a schematic view illustrating the dewatering method of the present invention when one end of a subsea pipeline is at or near the surface and the other end of the pipeline is on or near the seabed where a pig receiver of the present invention is located.

Offshore drilling for oil/gas is continuing to expand at further distances from shore and at greater depths. Subsea pipelines are utilized to transport the discovered product between a variety of points. These points include existing or new offshore trees, manifolds, pipelines, platforms, vessels or onshore facilities. As new wells are completed subsea pipelines flowing the product are tied through manifolds to existing pipelines that are already in place to bring the product to shore. As dictated by law, the new sections of pipeline require hydrostatic testing to make certain that the line has no leaks. Hydrostatic testing requires that the pipeline be filled with water and then be raised to the testing pressure by the addition of more water. In most cases, it is necessary to remove the water from the pipeline after hydrostatic testing. Therefore, in addition to hydrostatic testing, other steps in the commissioning of the pipeline may be required, including dewatering, drying, cleaning, and installing chemicals. The present invention is directed to the dewater commissioning of these subsea pipelines however configured where the water is removed by pumping carried out on the seabed rather than at the surface.

Once a well is completed, a pipeline is connected to the well for moving the product to shore. The pipeline is often not extended all the way to shore but is tied through a manifold or connection to offshore facilities. Manifolds as used herein may have a variety of specific structures; however, the common function for the purpose herein is that sections of pipelines are connected to other facilities, including other pipelines via various connection assemblies referred to herein as manifolds. Also common to a manifold as used herein is that there is structure to provide internal access to the pipeline. The subsea performance or operation of the commissioning method of the present invention, will be described as a method of commissioning a pipeline between two manifolds; however, it is understood that the commissioning is not limited to that portion of a pipeline between two manifolds but includes any subsea pipeline or pipeline segment, most particularly one which has or could have at least one end at the seafloor at the time of testing and commissioning.

The present invention is directed to a dewatering commissioning method wherein the pig receiving operation is carried out and is enhanced by using a pump operated by a subsea vehicle (SV) at the end of the pipeline on or near the seabed. The method is illustrated by using a subsea vehicle to assist in the operation and assumes that valves that require to be mechanically operated (opened or closed) are operated by the subsea vehicle. This is only one embodiment of the invention since the degree of assistance necessary by the subsea vehicle may be materially reduced with the use of automated valves not requiring mechanical operation. The subsea vehicle need not carry the pump(s) or other equipment as shown in the embodiment illustrated by the drawings, an alternative would have skids carrying the pump placed on the seabed near the subsea end of the pipeline.

Referring to FIG. 1, a subsea pipeline 10 is shown between two manifolds 12 and 14. For the purpose of illustration, manifold 12 includes a pig launcher and manifold 14 supports a pig receiver of the present invention, which will be described herein below. Manifold 12 may be on or connected to a structure 16. Structure 16 may be a platform, a vessel or other structure on or near the surface. However, manifold 12 may be on or near the seafloor, as described in the parent application referred to herein above. In one embodiment, structure 16 may be a pipe laying vessel. To assist in the commissioning of a new pipeline 10, a subsea vehicle (SV) 18 may be employed. The SV may be a remotely operated vehicle (ROV) or autonomous underwater vehicle (AUV) as these vehicles are known in the prior art, or they may be modified for the purposes of the present invention, or may include any manned or unmanned vehicle that has a system that can manipulate the hoses, pumps and other equipment used in the commissioning method. The SV 18 may be tethered to the support vessel 20 and may have a tether management system (TMS) assuring that the tether is not in the way of any operation. The SV 18 provides the electrical system for its operation and other equipment, as will be described hereinafter. Alternatively, an electrical umbilical cord may be part of the tether and tether system. The SV 18 may install by use of its robotic arm 19 or other tools, the manifold 14, or in an equally desirable embodiment, the manifold 14 may be installed on the pipe end and laid with the pipe at the time the pipeline 10 is laid.

Figure 3:
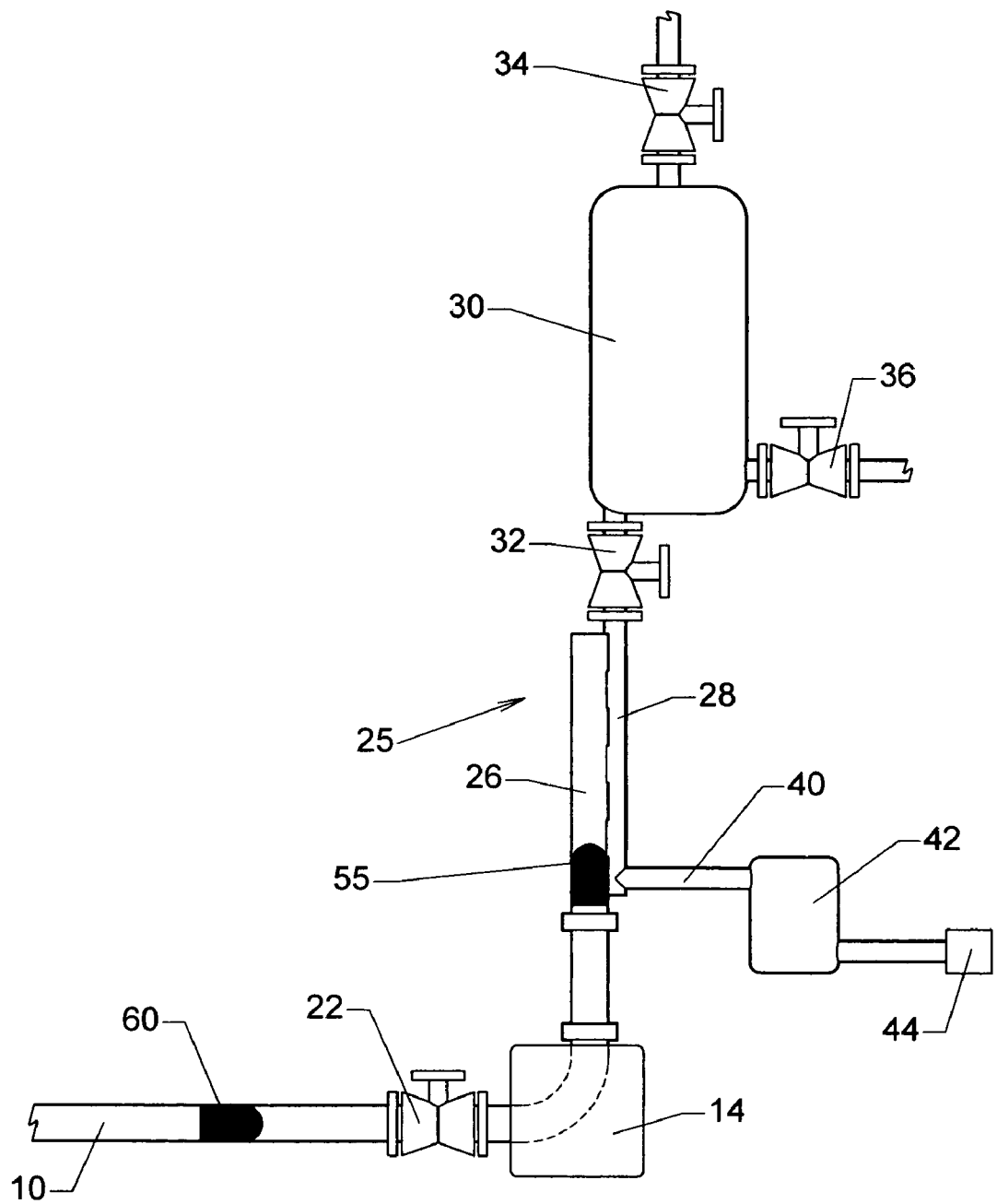
FIG. 3 is a schematic view of a subsea pipeline having a pig receiver of the present invention, with a first pig entering the pig receiver chamber and a second pig in the pipeline.

Referring now to FIG. 2 and FIG. 3, pipeline 10 is commissioned by filling the pipeline with water and then making a hydrostatic test. The details of these methods are set forth in detail in the parent applications identified above, and made a part hereof. FIG. 2 and FIG. 3 are specific to the dewatering commissioning method of the present invention and assumes that the pipeline is initially filled with water. However the manifold 14 is placed on the seafloor, a pipe end isolation valve 22 is positioned between the end of pipeline 10 and manifold 14.

Supported by manifold 14 is a pig receiver 25 of the present invention. Pig receiver 25 has a receiving chamber 26 that all pigs may enter, a stand pipe 28 attached to chamber 26 and in fluid communication therewith, and a gas chamber 30 attached to stand pipe 28. FIG. 2A illustrates the fluid communication between receiving chamber 26 and stand pipe 28, fluidly connected. FIG. 2B illustrates that receiving chamber 26 and stand pipe 28 are connected. A valve 32 is between stand pipe 28 and gas chamber 30. Gas chamber 30 has a valve 34 at the top of chamber 30 and another valve 36 at the lower side of the chamber 30. A water outlet line 40 from the stand pipe 28 removes water from the pipeline 10 via the receiving chamber 26 and stand pipe 28. In line 40 is a gas sensor 42, and the line ends in a remotely operable connector 44 for connecting the pump(s) 50 on skid 52 operated by and preferably powered, controlled and carried by the SV 18.

During dewatering, water flows from the pipeline 10 into the receiving chamber 26 and stand pipe 28. Any gas entrained in the flow rises in the stand pipe 28 due to gravity separation and displaces water from gas chamber 30 as it enters gas chamber 30, while water flow from the pipeline 10 (and from gas chamber 30) moves to pump 50 via line 40. It is recognized that the configuration of pig receiver 25 is not limited to that shown in FIG. 2 but may have a horizontal receiving chamber 26 and a pipe stand 28 with at least a portion thereof in the vertical on which the gas chamber 30 is mounted.

In the dewatering method, a pig 55 is placed into the water filled pipeline 10 by pig launcher 12 and behind the pig 55 is injected compressed gas from a source 58. Additional pigs may be injected behind pig 55 with gas or liquid chemicals between any two pigs. At the same time pump 50 is connected by SV 18 using its robotic arm 19 or other tools to the connection 44 at the end of pipeline 10 to draw the water from the pipeline. The pump then draws the pig 55 from the manifold 12 toward the manifold 14. The pump 50 can be used to efficiently overcome the hydrostatic head and the gas pressure need be only sufficient, one to two atmosphere more than needed to overcome friction between the pig(s) and the pipe wall and maintain a positive suction head for the pump.

At the beginning of the dewatering method chamber 30 is filled with water, with valves 34 and 36 being closed and valve 32 being opened by the SV 18 prior to beginning pumping. As pumping continues, pigs 55, 60, etc, are drawn along the pipeline toward the pig receiver 25. As the pigs pass welds or other irregularities in the pipe wall, some of the compressed gas behind the pig 55 will leak past the pig 55 and some of the water will leak past pig 55 to be swept along by any subsequent pig(s). Any gas ahead of a pig will enter the pig receiver 25 along with the water and is separated by gravity, with the gas passing through valve 32 into the chamber 30. When gas fills chamber 30 such that gas enters line 40, the gas is sensed by sensor 42 and pump 50 is shut off preventing gas to enter pump 50 where it would cause the pomp to lose its prime. With the pump 50 off, the gas chamber 30 may be vented of gas by closing valve 32 and opening valves 34 and 36 so the gas escapes chamber 30 and chamber 30 fills with water. After a short time, valves 34 and 36 are closed and valve 32 is opened permitting gas remaining below valve 32 to displace water from gas chamber 30 and allowing water from gas chamber 30 to fill stand pipe 28 and fill line 40 and gas sensor 42. Pump 50 is restarted and the cycle is repeated as necessary. Fluid communication between the stand pipe 28 and the pig receiving chamber 26 allows the pig to be drawn into the chamber 26. Motion of the pig stops as soon as the trailing edge of the pig moves past an opening between pig receiving chamber 26 and stand pipe 28. The first pig 55 drawn into the receiving chamber 26 of pig receiver 26 is shown in FIG. 3 and essentially all the water has been removed from pipeline 10 to the extent possible with a single pig. The method makes it possible to achieve incrementally greater stages of dryness until all of the water has been removed by moving a train of pigs through the pipeline while still taking advantage of the benefits of using a pump to overcome hydrostatic head.

When communication is established, water from gas chamber 30 and gas from behind the pig exchange places, flooding the short length of pipeline ahead of the next pig. If the volume of gas available from the pipeline exceeds the storage volume of stand pipe 28 and gas chamber 30 it will enter gas sensor 42 causing the pump to stop. Valves 32, 34, and 36 are then cycled as above to vent the gas until the short section of pipeline ahead of the next pig if flooded, as is the flow path from the pipeline through line 40 to the pump. Pumping is then resumed to pull the next pig into pig receiving chamber 26.

The capacity of pig receiver 25 is set before deployment to accommodate the intended number of pigs. This is done by setting the internal length of pig receiving chamber 26, and may be accomplished by adjusting the length of chamber 26, by inserting one or more spacers into chamber 26, or other convenient means. As each pig in the sequence enters pig receiving chamber 26 it pushes the previous pigs ahead to make room. The preset capacity of pig receiving chamber 26 does not allow the last pig in the sequence to enter far enough to establish communication between pig receiving chamber 26 and stand pipe 28, and thus prevents water from gas chamber 30 from entering the pipeline after the last pig is received. Pipeline end isolation valve 22 is then closed and pig receiver assembly 25 can be removed so that the end of the pipeline can be connected to its intended termination point. For those applications where the required degree of water removal cannot be accomplished by swabbing the inside of the pipeline with a number of pigs, a slug of liquid chemical such as methanol can be placed between two or more pigs in the sequence to absorb water and leave the pipe wall free of moisture. When this slug of liquid chemical reaches the end of pipeline 10 it will be removed by pump 50 as though it were water, and any gas in the chemical will be separated by gravity and passed to gas chamber 30 as above so that pump 50 will not lose its prime. Thus, the method can be used to dewater pipeline 10 sufficiently to meet the criteria of leaving no moisture that could contribute to corrosion. The pipeline is considered dry and/or treated.

The invention claimed is:

1. A method for dewatering a pipeline having at least one end near the seafloor comprising:

attaching a compressed gas source to a first end of a pipeline having a dewatering pig disposed within;

attaching a pig receiver to a second end of the pipeline located subsea, said pig receiver including a gas-fluid separator adapted to separate gas from fluid being pulled through the pig receiver;

attaching a subsea dewatering pump in fluid communication with the gas-fluid separator;

releasing the compressed gas behind the dewatering pig to push the pig toward the second end of the pipeline;

operating the subsea dewatering pump with a submersible vehicle (SV) to draw fluid and the pig towards the second end of the pipeline;

separating gas arriving at the pig receiver via the gas-fluid separator and collecting the gas that enters said pig receiver in a gas chamber; and sensing gas in a water outlet line of said pig receiver and, upon said sensing, shutting off said dewatering pump, wherein gas collected in the gas chamber is vented when the dewatering pump is shut off and the dewatering pump is restarted after venting of the gas to prevent gas locking of the subsea dewatering pump, thereby drawing essentially all the water out of said pipeline with a subsea pump operated by a submersible vehicle (SV) at said end near the seafloor.

2. A method according to claim 1, wherein the venting of gas followed by restarting of the dewatering pump occurs in a repeating cycle until the pipeline is dewatered.

3. A method for dewatering a pipeline having at least one end near the seafloor comprising:

attaching a compressed gas source to a first end of a pipeline having a dewatering pig disposed within;

attaching a pig receiver to a second end of the pipeline located subsea, said pig receiver including a gas-fluid separator adapted to separate gas from fluid being pulled through the pig receiver;

attaching a subsea dewatering pump in fluid communication with the gas-fluid separator;

releasing the compressed gas behind the dewatering pig to push the pig toward the second end of the pipeline;

operating the subsea dewatering pump with a submersible vehicle (SV) to draw fluid and the pig towards the second end of the pipeline;

separating and collecting gas that enters said pig receiver in a gas chamber;

sensing gas in a water outlet line of said pig receiver and, upon sensing of the gas, shutting off the subsea dewatering pump to prevent gas locking of the pump; and venting gas collected in the gas chamber when the dewatering pump is shut off and restarting the dewatering pump if necessary after venting of the gas, thereby drawing essentially all the water out of said pipeline with a subsea pump operated by a submersible vehicle (SV) at said end near the seafloor.

4. A method according to claim 3, wherein multiple pigs are propelled down said pipeline and into said pig receiver.

5. A method according to claim 4, further comprising swabbing the pipeline by placing a slug of liquid chemical between two or more of the multiple pigs.

* * * * *